July 11, 1939.  A. E. ALBERGA ET AL  2,166,033
ELECTRIC FUSE AND METHOD OF ASSEMBLING SAME
Filed Dec. 28, 1936  2 Sheets-Sheet 1
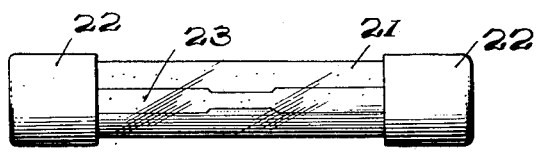
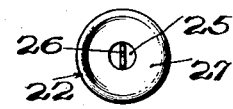
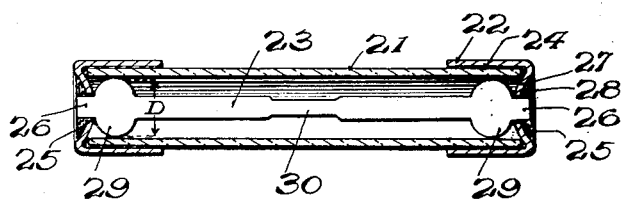
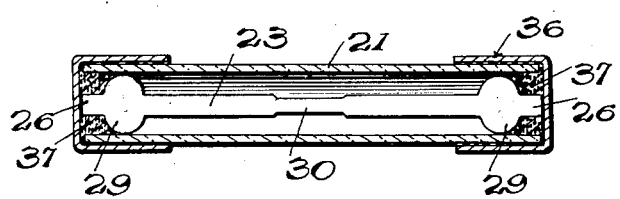
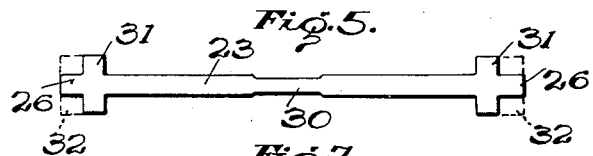
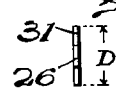
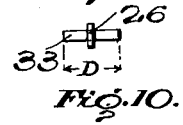
Inventors
Arnold E. Alberga
Henrie C. Alberga
By Cameron, Kerkam + Sutton
Attorneys

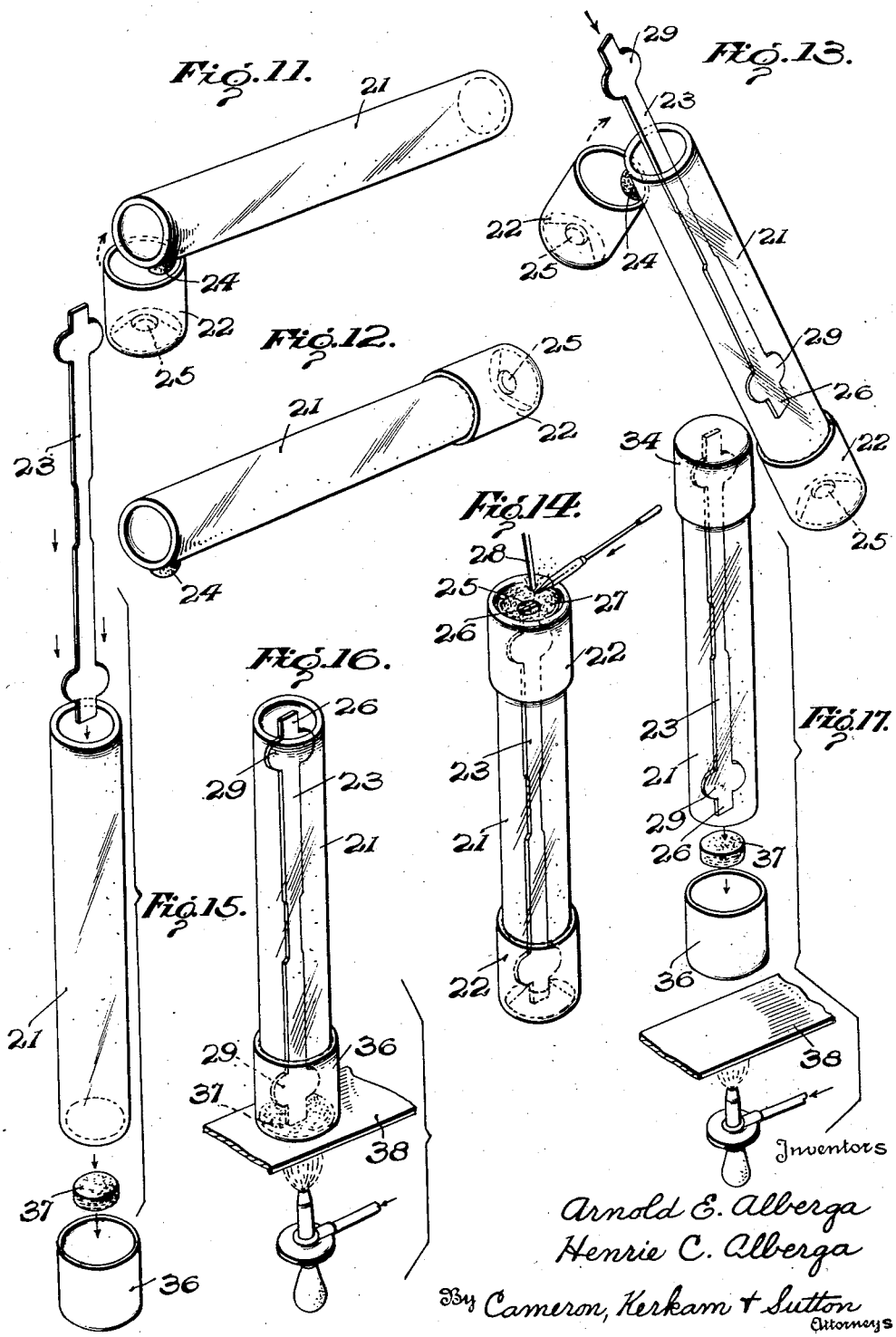

Patented July 11, 1939

2,166,033

UNITED STATES PATENT OFFICE 2,166,033

ELECTRIC FUSE AND METHOD OF ASSEMBLING SAME

Arnold E. Alberga and Henrie C. Alberga, Hempstead, N. Y.

Application December 28, 1936, Serial No. 117,992

10 Claims. (Cl. 200—131)

This invention relates to electric fuses, and more particularly to fuses of the cartridge type.

In manufacturing fuses of this character, it has long been customary to cement or otherwise secure a pair of metallic ferrules or caps to the opposite ends of a tube of glass, fiber, pressed paper or other suitable insulating material, to then drop a narrow elongated fuse link into the tube through an opening formed in one of the end caps, taking care that the entering or lower end of the link comes to rest within a like opening in the other ferrule or cap, to next maintain the link in a properly centralized position both axially and radially of the tube, and to finally solder to the caps the ends of the link which project into the openings formed therein. With fuses of this type, however, much difficulty has been experienced in properly positioning the link within the tube and in holding the same in place during the soldering operation; many such fuses must be rejected after assembly because of the failure of both ends of the links to extend into the openings in the end caps and to become securely soldered thereto. This defect may be due to any one of a number of factors, such as a failure of the entering end of the link to come into registry with the opening in the lower ferrule or cap when the link is dropped into the tube, or an upward pulling of the lower end of the link out of its ferrule opening during soldering of the upper end.

Although various expedients have been hitherto suggested for the purpose of curing the defects and disadvantages of the structures and assembling methods of the prior art, including provision of an enlarged head on one end of the link to prevent it from slipping into the tube and the use of a link having a length greater than that of the fuse to enable a positive holding thereof in position, none has been entirely satisfactory and all are subject to one or more objections from a practical commercial standpoint.

It is therefore one of the objects of the present invention to provide an electric fuse of novel construction which is extremely economical to manufacture and assemble, and is so constructed as to avoid all of the difficulties heretofore encountered in the production of fuses of the character in question.

Another object is to provide an improved method of assembling the constituent parts of a cartridge fuse which will effect a material reduction in the time and cost of manufacture, eliminate waste, and also permit the most efficient and flexible use of whatever labor may be available.

A further object is to provide a new and improved form of link for enclosed, ferrule type fuses which is so constructed as to insure proper positioning of the link during assembly of the fuse elements and maintenance of that proper position after the assembly is completed but prior to the final soldering operation.

Still another object is to provide a fuse of the character described wherein the fuse link may be initially formed of exactly the correct length so as to avoid subsequent trimming and waste, and is of such construction that it not only centers itself within the fuse enclosing tube with its ends in proper position for soldering, but also fixes the positions of the end caps or ferrules at a predetermined distance apart.

A still further object is to provide a fuse link of novel construction which, after it has been placed within the tube and the ferrules or end caps have been secured to the tube, is locked in proper position for soldering against all disturbing forces other than actual fracture of the tube.

Another object is to provide a new and simple method of assembling fuses which is especially well adapted for large scale production using manual labor wherein the number of operations performed and the likelihood of error are reduced to a minimum with an attendant increase in the speed and quality of output.

These and other objects will appear more fully upon a consideration of the detailed description of the invention which follows. Although several different forms of fuse and link construction, and two specific methods of assembly, have been described and illustrated in the accompanying drawings, it is to be expressly understood that these drawings are for the purpose of illustration only and are not to be construed as defining the scope of the invention, reference being had for this latter purpose to the appended claims.

Referring now to the drawings, wherein like reference characters indicate like parts throughout the several views:

Fig. 1 is a side elevation of one form of fuse embodying the present invention;

Fig. 2 is an end elevation of the fuse of Fig. 1 before the final soldering operation is performed;

Fig. 3 is an axial sectional view of the fuse of Fig. 1 with the fuse link shown in full;

Fig. 4 is an axial sectional view of another form of fuse constructed in accordance with the invention;

Figs. 5 and 6 are side and end elevations, respectively, of a modification of the preferred form of fuse link shown in Figs. 1–4;

Figs. 7 and 8 are side and end elevations, respectively, of another form of fuse link embodying the invention;

Figs. 9 and 10 are side and end elevations, respectively, of still a fourth form of fuse link;

Figs. 11–14 are diagrammatic views illustrating the various steps in the method of assembling the fuse of Figs. 1–3 in accordance with the present invention; and Figs. 15–17 are similar diagrammatic views illustrating the method of assembling the fuse of Fig. 4.

There is shown in Figs. 1–3, 5 and 6 an extremely simple form of fuse embodying the present invention which lends itself unusually well to economical manufacture and efficient assembly by the method illustrated in Figs. 11–14, and which is free from the various defects and disadvantages of those hitherto known to the art. As illustrated, this embodiment of the invention comprises a cylindrical tube 21 forming a casing for the fuse, a pair of end caps or ferrules 22 for the ends of the tube, and a fuse link 23 positioned within the tube 21 and connected at its ends to ferrules 22. The end caps or ferrules 22 may be made of any suitable electrically conductive metal, such as brass, and fixedly secured to the ends of the tube 21, formed of insulating material such as glass, fiber, pressed paper or the like, either by an adhesive such as cement, solder, or other suitable compound, or by crimping around the tube. In the specific embodiment illustrated, the tube 21 is made of glass as is customary in fuses of the type used in the electric circuits of automotive vehicles, and the end caps 22 are secured thereto by an adhesive indicated at 24. The end face of each cap 22 is provided with a centrally located opening 25 in which is received the end portion 26 of the fuse link 23, the width of the latter being only slightly less than the diameter of the opening 25. The end face of each cap 22 is also indented as indicated at 27 to form a well which serves to receive an amount of solder 28 by which the link end 26 is physically and electrically connected to the cap 22.

The link 23 is initially formed, as by stamping, of a length equal to or slightly less than the overall length which it is desired that the fuse should possess when properly assembled, and is provided with novel means which perform the multiple function of centralizing the link within the tube 21, establishing or determining the positions of the end caps 22 relative to one another and to the link, and locking the link against displacement from its proper position once the elements are assembled. In the form of link shown in Figs. 1–4 and 11–17, this means consists of a pair of cross members 29 secured to, and preferably formed integral with, the body of the link and extending transversely thereto at points adjacent to but spaced from the link ends which project through the openings 25 in caps 22. In the preferred form of the invention, the cross members 29 are rounded at their ends as shown so as to enable them to slide more easily when entering the tube 21 and are stamped out of the same piece of metal as the fuse link 23. The maximum dimension D of each cross member 29 perpendicular to the length of the link is only slightly less than the inside diameter of the tube 21, while the spacing of the cross members from the ends of the link is such that, when the fuse is properly assembled, the indented portions of the end caps 22 around openings 25 will abut against the outer edges of the cross members, thereby definitely fixing the caps in positions the correct predetermined distance apart. Since the dimension D of each cross member is greater than the diameter of the opening 25 in the end cap, it is obvious that the cross members also prevent the link from falling out of the tube through said openings. As is conventional in fuses of this character, the central portion of the link 23 is reduced in cross sectional area as indicated at 30 so as to be fusible upon the passage therethrough of a predetermined amount of electric current.

If desired, the cross member construction of Figs. 1–4 and 11–17 may be modified as indicated in Figs. 5 and 6 to provide rectangular cross members 31 having squared ends instead of the rounded ends previously described. Where the fuse link is to be used in a fuse having imperforated end caps of the character shown in Fig. 4 later to be described, the cross members need not be spaced inwardly from the ends of the link but may extend to the ends in the manner indicated in broken lines at 32 in Fig. 5.

Instead of the integrally stamped constructions of Figs. 1–6 and 11–17, the link 23 may be provided with a pair of pin or needle members 33 passing transversely through, and fixed perpendicularly to the flat sides of, the link as shown in Figs. 7 and 8, the length D of each pin being only slightly less than the inside diameter of the tube in which the link is to be housed. The pins 33 are also so spaced from the ends of the link as to constitute stops or positioning members for the end caps 22 and locking means for the link in the same manner as previously described.

Still another modification of the fuse link construction of the present invention is shown in Figs. 9 and 10. In this form, the link 23 is suitably secured as by rivets 34 or any other desired means to a strip 35 of insulating material of a width D only slightly less than the inside diameter of the tube 21 and of a length corresponding to the distance between the outer edges of the cross members 29 and 31 or the pin members 33 of the embodiments previously described. With this construction, the end portions 26 of the link project beyond the ends of strip 35 for extension into the openings 25 of the end caps 22, the end edges of strip 35 serving as stops for determining the positions of said end caps and also locking the link against movement out of its proper position.

The fuse links of the present invention are also adaptable to use in fuses of the type illustrated in Fig. 4 wherein the end caps or ferrules 36 are formed with solid end faces. In this construction, the end caps 36 may either be secured to the tube 21 by adhesive in the same manner as the fuse shown in Figs. 1–3 or, as indicated, be fixed to both the tube and the end portions 26 of the fuse link simultaneously by amounts of solder or other suitable compound 37 originally deposited in the caps in solid form and then fused by the application of heat after the caps, tube and fuse link have been placed in assembled position.

Referring now to Figs. 11–14, there is diagrammatically illustrated therein a new and efficient method for assembling fuses of the type shown in Figs. 1–3 which is particularly well adapted for manual operation. As shown in Fig. 11, the first phase of the method consists in applying a small amount of cement or other adhesive 24 to one end of the tube 21, then, while holding the tube in a slightly inclined position, bringing an end cap 22 into engagement with the lower end of the tube with the adhesive 24 within the confines of the cap, and finally moving the cap upwardly and over the end of the tube 21 as indicated by the arrow in Fig. 11. A slight rotation of the cap 22 relatively to the tube 21 will insure distribution of the adhesive 24 around the entire periphery of the tube. With this manner of handling the end cap, none of the adhesive is lost or spread over those areas of the cap or tube which will be exposed after the assembly is completed.

The next step, illustrated in Fig. 12, is to invert the tube end for end and place another gob of adhesive 24 on the uncapped end of the tube. By then holding the tube in an inclined position with the uncapped end uppermost and with the second cap in the position indicated in Fig. 13, the link 23 may be dropped or placed in the tube without coming into contact with or losing any of the adhesive. Because of the provision of cross members 29, the link 23 is automatically centered within the tube 21 and its lower end portion 26 enters into the opening 25 formed in the already secured cap 22. The second cap 22 may then be slid over the upper uncapped end of the tube in the same manner as the first cap, whereupon, again due to the provision of cross members 29, the upper end portion 26 of the fuse link will be received within the opening 25 of this second cap. The link 23 is then positively locked in its proper position and cannot be dislodged therefrom by any disturbing force other than fracture of the tube 21. This being so, it is possible to store the fuses in this form for any desired period of time before completing their manufacture by soldering the end portions of the links to the end caps without fear that handling or storage will disturb the assemblies. When both end caps have been placed on the tube, the assembly is usually permitted to stand, or is placed in an oven, for a sufficient length of time to insure complete drying of the adhesive. The final soldering operation, indicated in Fig. 14, may then be performed at any desired time, this operation consisting simply in melting a sufficient portion of solder 28 into the solder well at each end of the fuse to insure closure of the openings 25 and proper connection of the end portions 26 of the fuse link to the caps 22. It is also to be noted that, by initially forming the fuse link of exactly the desired length, it is unnecessary to trim the ends after assembly.

The method of assembling the modified form of fuse shown in Fig. 4 is illustrated in Figs. 15, 16 and 17. According to the procedure there shown, a slug 37 of fusible solder or other suitable composition is first placed in one of the end caps 36, one end of the tube 21 is next inserted into the cap, and then the fuse link 23 is dropped into the tube through the uncapped end thereof until the lower end portion comes to rest on top of the solder slug. If the end cap 36 is then passed over or placed on a heated surface 38, the slug of solder or other suitable compound will be melted and some of it will find its way up into the space between the inner wall of the end cap 36 and the outside of the tube 21, the rest surrounding the end portion 26 of the fuse link and filling the bottom of the cap. As in the previously described method, the cross members 29 maintain the fuse link in its proper centralized position during this operation. After the solder 37 has been melted, the cap and the tube and link supported thereby are removd from the heated surface and allowed to cool until the solder sets.

The assembly is then inverted and the operation repeated in the manner indicated in Fig. 17 so as to secure the other end cap to the tube and to effect connection between the second cap and the other end portion of the fuse link.

There is thus provided by the present invention a novel form of cartridge fuse which is primarily characterized by the presence therein of a fuse link of new and improved construction. In each of the various embodiments of the invention disclosed herein, the fuse link is so constructed that it automatically centralizes itself in the enclosing tube when placed therein without requiring the assistance of extraneous positioning means. The new links are particularly advantageous in fuses of the type shown in Figs. 1–3 and 11–14 which employ apertured end caps. In these fuses, by centrally locating the link in the tube, the end portions of the link must invariably come into registry with and enter the openings in the end caps in proper position for soldering. Once the end caps are secured to the tube, the centralizing cross members of Figs. 1–8 and 11–17, or the transverse end edges of the centralizing strip of Figs. 9 and 10, positively lock the link in place so that it cannot fall out of the tube through the openings in the end caps or be displaced in any other manner short of breaking the tube. For example, lifting of one end of the link out of the opening in its adjacent end cap due to capillary action during the soldering of the other end, a defect often encountered in previous fuses, is effectively prevented by the present construction wherein the link is locked against movement in both directions. This same construction also definitely controls the overall length of the fuse by providing stops against which the end caps abut when the fuse is properly assembled, and eliminates all trimming waste in that the links may be initially cut to exact size.

The invention also provides a simple and efficient method of assembling fuses which is a marked improvement over the procedures heretofore used in the practical industry. Whereas in prior methods the link does not enter the assembly until after the end caps have been permanently secured to the tube, thereby requiring a separate operation or at least one extra handling of the fuse to insert the link in cases where the caps are secured to the tube by adhesive, the method of the present invention is such that the whole operation may be completed at one time without any intervening period in which the tube and end cap assembly must be set aside for drying or setting of the adhesive before the link may be inserted. Moreover, with fuses of the construction herein disclosed in which the links are positively locked against displacement, the soldering operation may be performed at any time after the initial assembly; in prior methods, the soldering must be done at the time when the links are inserted in the fuses or else they may become displaced or entirely drop out of the assembly during subsequent handling. This feature of the invention enables the manufacturer to work his labor force at maximum efficiency and with full flexibility regardless of whether or not there are available sufficient workers for performing each operation to maintain a uniform rate of work in each phase of the assembling procedure.

While several embodiments of the invention have been specifically described and illustrated, it will be obvious that the invention is not limited to the exact structures and procedural steps shown in the drawings but is capable of a variety of modifications. For example, the specific construction of the link centralizing means may be varied in a number of ways without passing beyond the bounds of the invention, as by forming the cross members of Figs. 1-6 separately from the fuse link and securing the same thereto in any suitable manner as by soldering or riveting. The exact shape of the cross members is also subject to variation, as desired. It is likewise obvious that these cross members need not be made of metal but may be formed of any other suitable material, such as the insulating material of which the strip 33 of Figs. 9 and 10 is formed. As has already been pointed out, the invention is not limited to fuses employing enclosing tubes of any specific material or end caps of any specific construction, although it is true that the improved fuse link finds particular usefulness in connection with indented, apertured end caps of the type shown in Figs. 1-3 and 11-14. The exact manner in which the end caps are secured to the tube is also obviously immaterial to the invention, as is the particular way in which the various elements are handled during the assembling operation. In this respect, the showing of Figs. 11-17 is merely illustrative of two particular techniques which have been found successful in practical commercial operations.

Various other changes, which will now become apparent to those skilled in the art, may be made in the form, details of construction and arrangement of the parts, and in the procedural steps of the method, without departing from the spirit of the invention. Reference is therefore to be had to the appended claims for a definition of the limits of the invention.

What is claimed is:

1. An electric fuse comprising a tube of insulating material forming the fuse casing, a metallic cap secured to and closing each end of said tube, a fuse link within said tube in electrical connection at its ends with said caps, and means carried by said link intermediate the ends thereof for centralizing the same within said tube, said means having a dimension perpendicular to the axis of said tube only slightly smaller than the inside dimension of the latter and a dimension parallel to the axis of said tube relatively small as compared to the length of said link.

2. An electrical fuse comprising a tube of insulating material forming the fuse casing, a metallic cap secured to and closing each end of said tube, and a fuse link within said tube in electrical connection at its ends with said caps, said link including centralizing means adjacent to but spaced inwardly from each end projecting transversely beyond the sides thereof and having a dimension perpendicular to the axis of said tube only slightly smaller than the inside dimension of the latter and a dimension parallel to the axis of said tube relatively small as compared to the length of said link.

3. An electric fuse comprising a tube of insulating material forming the fuse casing, a metallic cap secured to and closing each end of said tube, an elongated fuse link within said tube in electrical connection at its ends with said caps, and members carried by said link adjacent to but spaced from the ends thereof and extending transversely to the length thereof, the maximum dimension of each of said members perpendicular to the length of said link being greater than the maximum width of the portion of said link intermediate said members and only slightly less than the inside diameter of said tube.

4. An electrical fuse comprising a tube of insulating material forming the fuse casing, a metallic cap secured to and closing each end of said tube, the end of each of said caps being depressed toward the center of said tube to form a solder well and having a centrally positioned opening therein, a fuse link of a length substantially equal to the desired overall length of the fuse and having end portions extending into the openings in said caps, said end portions being secured to said caps by means of solder deposited in said solder wells, and a transversely extending member carried by said link adjacent to but spaced from each end thereof a distance such that the depressed portion of the adjacent cap abuts thereagainst when the fuse is properly assembled, the maximum dimension of each of said members perpendicular to the length of said link being only slightly less than the inside dimension of said tube.

5. An enclosed fuse comprising an insulated casing, metallic closures at the ends of the casing, and a fuse link having its ends held in electrical connection by solder to the ends of the closures, said link having means thereon to axially center the link in the casing for soldering, said means extending transversely a greater distance than does the link for the greater portion of its length and maintaining the greater portion of the length of the link relatively remote from the walls of said casing, and extending longitudinally a distance less than the minimum distance between the connections of the link to the closures.

6. A fuse link for use in electric fuses of the tube and ferrule type consisting of an elongated piece of conductive metal having a pair of members fixed with respect to and extending transversely of said elongated piece at points adjacent to but spaced inwardly from the ends thereof, the maximum dimension of each of said members perpendicular to the length of said elongated piece being only slightly less than the inside dimension of the tube of the fuse in which said link is adapted for use, and the maximum dimension of each of said members parallel to the length of said elongated piece being less than the distance between said members.

7. A fuse link for use in electric fuses of the tube and ferrule type consisting of an elongated piece of conductive metal having members adjacent the ends thereof projecting transversely beyond the sides thereof, the outer ends of said members being rounded and the maximum dimensions thereof perpendicular to the length of said elongated piece being only slightly less than the inside dimension of the tube of the fuse in which said link is adapted for use.

8. A fuse link for use in electric fuses of the tube and ferrule type consisting of an elongated piece of conductive metal having a pair of pin-like members fixed with respect to and passing through said elongated piece at right angles to the length thereof at positions adjacent to but spaced from the ends thereof, the length of each of said members being only slightly less than the inside dimension of the tube of the fuse in which said link is adapted for use.

9. A fuse link for use in electric fuses of the tube and ferrule type consisting of an elongated piece of conductive metal having a strip of insulating material secured to said elongated piece, said strip being of a width greater than said elongated piece and only slightly less than the inside dimension of the tube of the fuse in which said link is adapted for use, the ends of said elongated piece extending beyond said strip to provide end portions by which the link may be connected to the ferrules of the fuse when assembled, and said strip having a length less than the minimum distance between the points where the link may be connected to the ferrules.

10. An enclosed fuse of the ferrule contact type comprising a casing of insulating material, metal caps on the ends of the casing, and a fuse link in said casing of substantially the same length as said fuse and having a plurality of longitudinally spaced lateral bearing points formed integrally therewith and bearing against the inner wall of said casing to axially center the link in the casing, at least one of said caps having an opening into which extends one end of the link and to which end said cap is soldered.

ARNOLD E. ALBERGA.
HENRIE C. ALBERGA.